United States Patent [19]
Kikuchi et al.

[11] Patent Number: 5,229,869
[45] Date of Patent: Jul. 20, 1993

[54] PORTABLE ORIGINAL READING APPARATUS

[75] Inventors: Makoto Kikuchi; Yoshihisa Otake; Hiroaki Sudo, all of Shizuoka, Japan

[73] Assignee: Tokyo Electric Co., Ltd., Tokyo, Japan

[21] Appl. No.: 684,279

[22] Filed: Apr. 12, 1991

[30] Foreign Application Priority Data

| Apr. 12, 1990 | [JP] | Japan | 2-97395 |
| Apr. 18, 1990 | [JP] | Japan | 2-102407 |
| Apr. 20, 1990 | [JP] | Japan | 2-104740 |

[51] Int. Cl.⁵ .................................. H04N 1/04
[52] U.S. Cl. ...................... 358/473; 358/496
[58] Field of Search ............... 358/474, 475, 476, 496, 358/497, 498, 473

[56] References Cited

U.S. PATENT DOCUMENTS

| 4,779,141 | 10/1988 | Watanabe | 358/497 |
| 4,835,619 | 5/1989 | Kobori et al. | |
| 4,845,570 | 7/1989 | Uchiyama | 358/475 |
| 4,905,090 | 2/1990 | Miyake | 358/476 |
| 5,072,307 | 10/1991 | Shirakoshi et al. | 358/476 |
| 5,124,801 | 6/1992 | Shinmura et al. | 358/473 |

FOREIGN PATENT DOCUMENTS 2169467 7/1986 United Kingdom .

*Primary Examiner*—Edward L. Coles, Sr.
*Assistant Examiner*—Kim Yen Vu
*Attorney, Agent, or Firm*—Oblon, Spivak, McClelland, Maier & Neustadt

[57] ABSTRACT

The invention provides an original reading apparatus which is small in overall thickness, light in weight and easy to hold by hand. The original reading apparatus includes a body case in the form of a flattened casing in which a power source and an electric controlling section to which power is supplied from the power source are contained. The body case has an original insertion opening formed in a wall thereof, and an original passageway is formed in the body case and communicated with the original insertion opening. An original reading section is disposed in the original passageway, and an operating section is mounted on the body case such that an operating face thereof is disposed on a surface of the body case. The original reading section and the operating section are disposed in a juxtaposed relationship in a horizontal position at a substantially same height.

17 Claims, 10 Drawing Sheets

PORTABLE ORIGINAL READING APPARATUS

FIELD OF THE INVENTION AND RELATED ART STATEMENT

This invention relates to an original reading apparatus for reading contents of an original, and more particularly to an original reading apparatus which is reduced in overall thickness and overall size to facilitate carrying thereof.

In recent years, original reading apparatus which read contents of an original by an optical method or the like have been put into practical use and are employed for facsimile apparatus, copying apparatus and so forth. Meanwhile, in the field of facsimile apparatus or the like, it has been and is demanded to realize an apparatus of the portable type designed to facilitate carrying thereof. As an apparatus which can meet such demand, an apparatus of the structure has been put into practical use wherein a reading apparatus for reading information of a picture image to be transmitted, a printing apparatus for printing picture image information received and an electric controlling section such as a transmitter-receiver circuit for picture image information and a power source apparatus are accommodated in a body case and an operating section for the transmission and reception is provided in the inside of the body case such that an operating face thereof is exposed to a surface of the body case.

Several problems of such prior art will be described subsequently. When such a case is considered that a facsimile apparatus of the portable type is actually used, a function to transmit picture image information to the other party at a place as free as possible is demanded, but in most cases, a function to receive and print picture image information is not often demanded preferentially. Such reasons for this may be listed that, with a portable apparatus, since the installation location thereof varies every moment, it is difficult for the other party to specify a location to which picture image information is to be transmitted, that, even if a location to which picture image is to be transmitted is specified, it is not clear whether the location belongs to an area to which transmission is available, and it is not clever to transmit picture image information to such location, and that, where it has a printing function, a high power is required for such printing output and a power source section of a large size is required for such high power, which may involve such an increase in overall size that makes the apparatus unsuitable for carrying. Accordingly, in such portable facsimile apparatus, where a function to transmit picture image information from a free location is realized, it is desirable that it is as small in size and light in weight as possible from the point of view of improvement in portability and so forth. Such an apparatus, however, has not been put into practical use as yet.

Meanwhile, an internal structure of such a portable facsimile apparatus as described above normally includes a picture image reading apparatus disposed below an operating section. Consequently, the overall height of the apparatus cannot be made smaller than a total dimension of a vertical dimension of the operating section and another vertical dimension of the reading apparatus. Accordingly, the apparatus has a drawback that it is difficult to reduce the overall thickness of the apparatus.

Further, such a portable facsimile apparatus as described above is designed on the premise that, when it is to be used, it is placed onto a table or the like. Besides, such portable facsimile apparatus is large in size, heavy in weight and great in thickness. Accordingly, it has another drawback that it is difficult to perform a transmitting operation while it is held by a hand. Consequently, it is very inconvenient to use the facsimile apparatus at a location which does not have a special space sufficient to allow the facsimile apparatus to be placed and used such as in a public telephone booth.

OBJECTS AND SUMMARY OF THE INVENTION

It is a first object of the present invention to provide an original reading apparatus which can be reduced in overall thickness.

It is a second object of the present invention to provide an original reading apparatus which can be reduced in overall thickness and overall weight.

It is a third object of the present invention to provide an original reading apparatus wherein a transmitting operation can be performed readily while it is held by a hand as a manner of use of the apparatus.

It is a fourth object of the present invention to provide an original reading apparatus for which maintenance can be performed readily.

It is a fifth object of the present invention to provide an original reading apparatus which can be protected from admission of dust and collision with an external article.

In order to attain the objects, according to the present invention, there is provided an original reading apparatus which comprises a body case, means for defining an original insertion opening in a wall of the body case, means for defining an original passageway in the inside of the body case in such a manner as to communicate with the original insertion opening, an original transporting section disposed in the original passageway for transporting an original introduced into the original passageway from the original insertion opening, a driving section disposed in the body case for driving the original transporting section, an original reading section disposed in the original passageway for reading data of the original transported along the original passageway, an operating section disposed in a juxtaposed relationship in a horizontal position at a substantially same height as the original reading section in the body case and having an operating face positioned at a surface of the body case, an electric controlling section for electrically controlling the operating section, driving section and original reading section, and a power source section for supplying power to the operating section, driving section, original reading section and electric controlling section. Accordingly, an operation of transmitting data of an original is started in response to an input from the operating section. In particular, an original inserted into the original passageway from the original entrance opening is transported by the original transporting section, and during such transportation, contents of the original are read by the original reading section. The data thus read by the original reading section are suitably processed by the electric controlling section. As such processing, the read data may be transmitted over a telephone network or stored into a memory, or such stored data in the memory may be outputted to a printer separate from the facsimile apparatus. On the other hand, since the operating section and the original reading section are disposed in a juxtaposed relationship in a horizontal position at a substantially same height, the entire apparatus can be formed with a small thickness.

Further, where the original passageway is disposed substantially horizontally, or where the original reading section and the driving section are disposed in a juxtaposed relationship in a horizontal position at a substantially same height and the operating section is disposed in a juxtaposed relationship in a horizontal position at a same height as the original reading section and besides the electric controlling section is disposed in the neighborhood of the driving section in a juxtaposed relationship in a horizontal position at a substantially same height as the original reading section and the power source section is disposed in the neighborhood of the electric controlling section and driving section in a juxtaposed relationship in a horizontal position at a substantially same height as the original reading section, the entire apparatus can be formed with a further reduced thickness.

DESCRIPTION OF THE PREFERRED EMBODIMENTS

Figure 1:
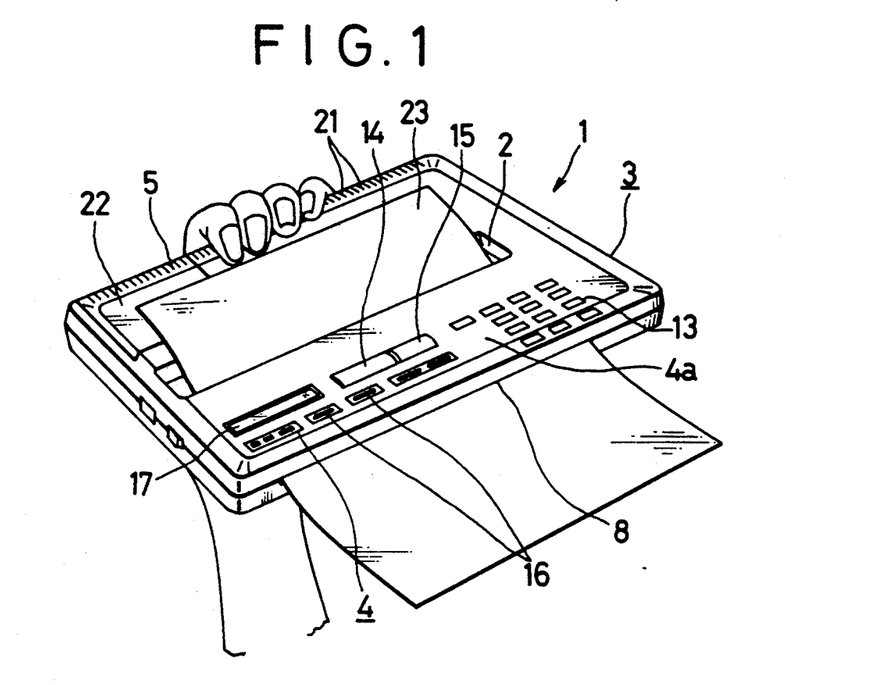
FIG. 1 is a perspective view of an entire original reading apparatus showing a first embodiment of the present invention together with a manner of use of the apparatus.

An original reading apparatus of an embodiment of the present invention will be described with reference to FIGS. 1 to 6. The original reading apparatus of the present embodiment is in the form of a facsimile apparatus 1. Referring first to FIG. 1, the facsimile apparatus 1 includes a body case 3 of a generally flattened profile. An original insertion opening 2 in the form of a slit for inserting an original 23 into the facsimile apparatus 1 therethrough is formed at a substantially mid portion of an upper wall of the body case 3, and an operating face 4a of an operating section 4 in the form of a flat keyboard is disposed at a front portion of the upper wall of the body case 3 while a gripping section 5 is formed at a rear edge portion of the upper wall of the body case 3. The origin insertion opening 2, operating face 4a and gripping section 5 are disposed such that the lengths thereof coincide with the longitudinal direction, that is, leftward and rightward directions, of the body case 3. Further, an original discharging opening 8 in the form of a slit is formed in a front end wall of the body case 3, and an original passageway 10 is formed substantially horizontally in the inside of the body case 3 such that it establishes communication between the original discharging opening 8 and original insertion opening 2 past the operating section 4. A feed roller 9 serving as an original transporting section is disposed adjacent a location of the original passageway 10 in the neighborhood of the original insertion opening 2 while an original reading section 7 is disposed adjacent another central location of the original passageway 10. Here, the original reading section 7 is formed such that a white roller 11 and an image sensor 12 in the form of a closely contacting line reading sensor are disposed in an opposing relationship to each other across the original passageway 10 such that the image sensor 12 can be contacted in a condition a little inclined from a horizontal condition with the white roller 11. It is to be noted that the feed roller 9 and the white roller 11 are formed with diameters as small as possible. Further, a control unit 6 is disposed at a rear location in the inside of the body case 3, and the control unit 6, feed roller 9, original reading section 7 and operating section 4 are provided in a juxtaposed relationship in horizontal positions at substantially same heights.

Figure 2:
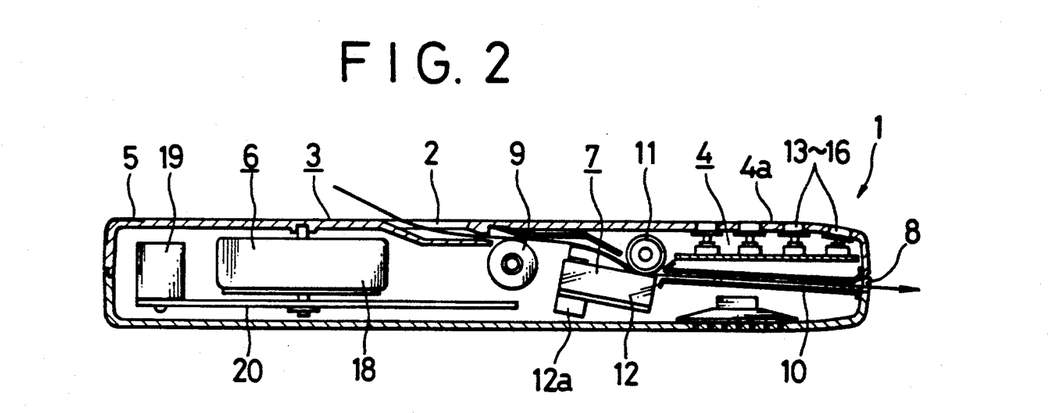
FIG. 2 is a vertical sectional side elevational view of the original reading apparatus of FIG. 1.

The operating section 4 includes ten keys 13, a start key 14 and a stop key 15 as well as various function keys 16, a liquid crystal display section 17 and so forth. Meanwhile, the control unit 6 includes a stepping motor 18 in the form of a flat motor serving as a driving section connected to the rollers 9 and 11 by way of a power transmitting mechanism 30, a circuit board 20 on which a modular connector 19 adapted to be connected to an external circuit (not shown) and a CPU (central processing unit) (not shown) to which the image sensor 12 is connected are mounted and which has a transmitting circuit (not shown) including a MODEM and so forth connected to the CPU, a motor controlling circuit (not shown) for the stepping motor 18 and so forth, and a battery not shown serving as an exchangeable power source section. Here, an electric controlling section is provided on the circuit board 20 on which the CPU is mounted. The electronic controlling section executes such control that it delivers a driving signal to the stepping motor 18 in response to an input key signal from the operating section 4, delivers a reading instruction signal for an original 23 to the original reading section 7 and delivers a transmission instruction of data read by the original reading section 7 to the transmitting circuit. Meanwhile, the gripping section 5 is formed so as to be suitable for the gripping by providing antislipping processing to a surface thereof, for example, such that the surface thereof is covered with a rubber layer on which a large number of depressions are formed successively. The battery and a battery cover 22 are removably mounted at a location of the body case 3 sidewardly of the gripping section 5.

Figure 3:
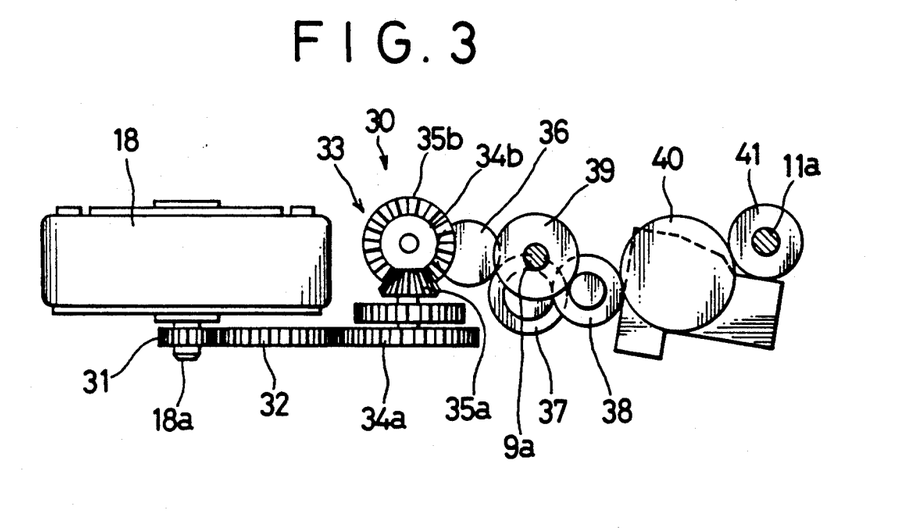
FIG. 3 is an enlarged side elevational view of a power transmitting mechanism of the original reading apparatus of FIG. 1 for transmitting a driving force of a stepping motor to a feed roller and a white roller.
Figure 4:
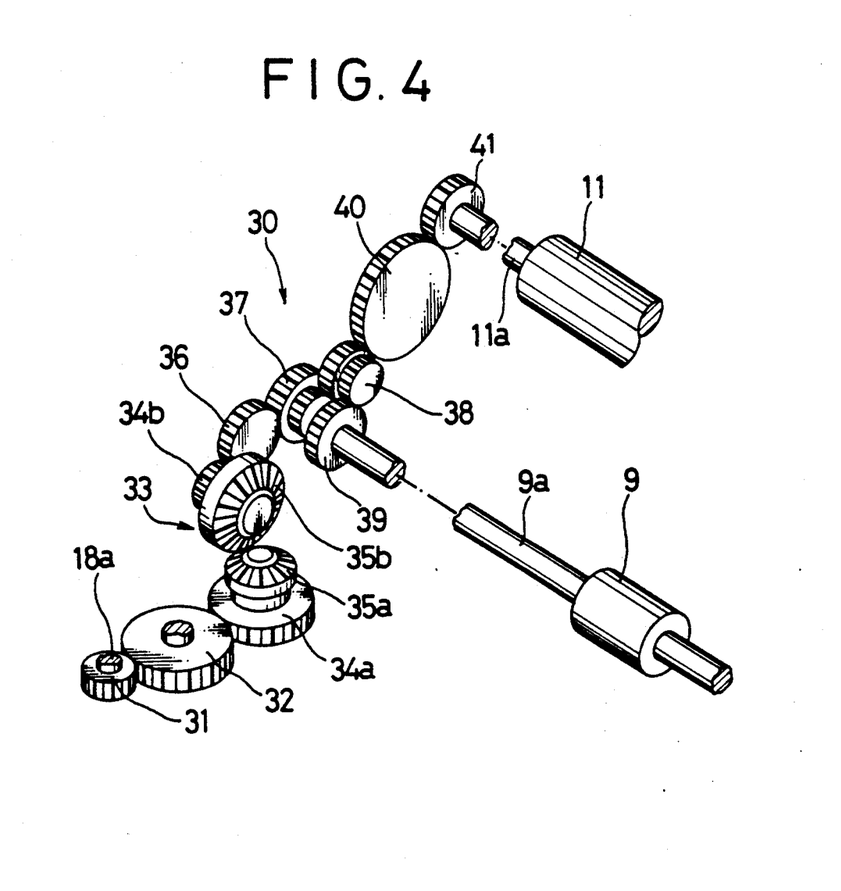
FIG. 4 is a perspective view of the power transmitting mechanism of FIG. 3.

Subsequently, the power transmitting mechanism 30 has a structure wherein an input power shaft and an output power shaft extend perpendicularly to each other as illustrated in FIGS. 3 and 4. In particular, the stepping motor 18 is disposed such that a rotary shaft 18a thereof is directed in a vertical direction, and a drive gear 31 is secured to the rotary shaft 18a of the stepping motor 18. An outputting direction changing gear train 33 is connected to the drive gear 31 by way of a first idler gear 32. The outputting direction changing gear train 33 includes a pair of gears including a pair of spur gears 34a and 34b and another pair of bevel gears 35a and 35b formed in a coaxial relationship to each other, respectively, and changes the inputting direction and the outputting direction by 90 degrees by meshing engagement between the bevel gears 35a and 35b. In particular, the first idler gear 32 is connected to the outputting direction changing gear train 33 as it is engaged with the spur gear 34a, and the spur gear 34b of the outputting direction changing gear train 33 is connected to a fourth idler gear 38 by way of second and third idler gears 36 and 37. Then, a follower gear 39 secured to a rotary shaft 9a of the feed roller 9 is connected to the fourth idler gear 38 while another follower gear 41 secured to a rotary shaft 11a of the white roller 11 is connected to the fourth idler gear 38 by way of a fifth idler gear 40.

With the facsimile apparatus 1 of such construction as described above, an original 23 is first inserted into the original insertion opening 2 while the modular connector 19 is connected to an external circuit by way of a cable (not shown), and then a facsimile number of the other party is inputted by way of the ten keys 13, and after then, the start key 14 of the operating section 4 is depressed. Consequently, a connected condition of the circuit with the other party is established and thereafter maintained so that a transmitting operation of picture image information of the original 23 is performed. In particular, at the electric controlling section provided on the circuit board 20, an operating signal is provided to the motor controlling circuit. Consequently, supply of power from the battery to the stepping motor 18 is enabled. As a result, the stepping motor 18 is driven under the control of the electric controlling section to rotate the rotary shaft 18a thereof, and such rotation of the rotary shaft 18a is transmitted to the rollers 9 and 11 by way of the power transmitting mechanism 30. More particularly, the drive gear 31 secured to the rotary shaft 18a is rotated, and such rotation is transmitted by way of the first idler gear 32 to the outputting direction changing gear train 33 in which the outputting direction is changed by 90 degrees from the inputting direction, whereafter it is transmitted to the fourth idler gear 38 by way of the second and third idler gears 36 and 37. Then, the rotation of the fourth idler gear 38 is transmitted to the follower gear 39 to rotate the feed roller 9 while it is also transmitted to the other follower gear 41 to rotate the white roller 11, and the original 23 is transported along the original passageway 10 by such rotation of the rollers 9 and 11. During such transportation of the original 23, picture image information of the original 23 is read by the image sensor 12, and the thus read picture image information is transmitted from the transmitting circuit of the control unit 6 to the external circuit by way of the modular connector 19. On the other hand, a reproducing operation of such picture image information is performed with a facsimile apparatus (not shown) of the other party which receives the thus transmitted picture image information from the facsimile apparatus 1.

It is to be noted that, upon such reading and transmitting operations of picture image information of the original 23, presence or absence of the original 23 being transported or transporting conditions of the original 23 such as a transporting speed are detected by transport detecting means not shown which is formed from a photo-sensor or the like, and the components of the facsimile apparatus 1 are controlled by the CPU of the electric controlling section provided on the circuit board 20 while referring to a result of such detection.

Here, in the present embodiment, reduction in overall thickness of the facsimile apparatus 1 is achieved by a combination of the construction wherein the original passageway 10 is formed substantially horizontally and the control unit 6, feed roller 9, original reading section 7 and operating section 4 are disposed substantially horizontally in a juxtaposed relationship in an order and several constructions which are employed for several components of the facsimile apparatus 1 so as to reduce the overall thickness of the apparatus 1. As constructions employed for several components to reduce the overall thickness of the body case 3, such constructions are listed, for example, that the operating section 4 is formed from a flat keyboard, that part of the image sensor 12 in the form of a closely contacting line reading sensor is disposed between the feed roller 9 and the white roller 11, that the feed roller 9 and white roller 11 are formed with possible minimum diameters, that the stepping motor 18 is a flat motor and is disposed in the body case 3 such that the rotary shaft 18a thereof is directed in a vertical direction and that the rotary shafts 9a and 11a of the rollers 9 and 11 which extend perpendicularly to the rotary shaft 18a of the stepping motor 18 are connected to the rotary shaft 18a by way of the power transmitting mechanism 30. Accordingly, in the present embodiment, the components of the apparatus 1 can be accommodated in the very thin body case 3. More particularly, it has been confirmed by the applicant that, even where the facsimile apparatus 1 is designed such that an original 23, for example, of the A4 size or the letter size can be read smoothly and well, the body case 3 can be formed with the thickness of 30 mm or so to the utmost.

Since the body case 3 in which various components are accommodated is formed very thin in this manner, a transmitting operation of picture image information of an original can be performed readily while the facsimile apparatus 1 is held by one hand. More particularly, such transmitting operation of picture image information of an original 23 is performed by inserting the original 23 into the original insertion opening 2 and operating the operating section 4 by one hand while the gripping section 5 is gripped by the other hand from below the apparatus 1 as illustrated in FIG. 1. In this instance, due to the facts that the gripping section 5 is formed and that antislipping processing is performed on the gripping section 5, the facsimile apparatus 1 can be held readily and with certainty by one hand. Further, since the original insertion opening 2 is formed at the central location of the body case 3, when the original 23 is to be inserted into the original insertion opening 2 with the other hand which does not grip the gripping section 5, the two hands will not cross each other, and consequently, a setting operation of the original 23 can be performed readily and smoothly. Accordingly, transmission of picture image information of an original 23 can be performed readily and smoothly at a free location, and for example, the facsimile apparatus 1 can be used at such a location at which no special installation spacing for a facsimile apparatus is provided as in a public telephone booth.

Further, with the facsimile apparatus 1 of the present embodiment, reduction in overall size is achieved by a combination of such constructions that the depth of the body case 3 can be decreased while assuring a sufficient length of the original passageway 10 because the original passageway 10 is positioned below the operating section 4, that the depthwise dimension of the body case 3 can be reduced because the original insertion opening 2 and the operating section 4 are provided such that the lengths thereof coincide with the leftward and rightward directions of the body case 3, that the depthwise dimension of the body case 3 can be reduced because the connector 12a as an electric connecting section of the image sensor 12 and so forth can be disposed in a spacing which is produced by an inclined arrangement of the image sensor 12 and that the number of necessary feed rollers is decreased because the white roller 11 of the original reading section 7 has an additional function as the original transporting section for transporting an original. Further, since the feed roller 9 and the white roller 11 are formed with possible minimum diameters, the electric capacity necessary for the stepping motor 18 is reduced so small that a stepping motor of a small size can be used as the stepping motor 18. Consequently, the part cost is decreased and the overall size of the apparatus is further reduced.

Figure 5:
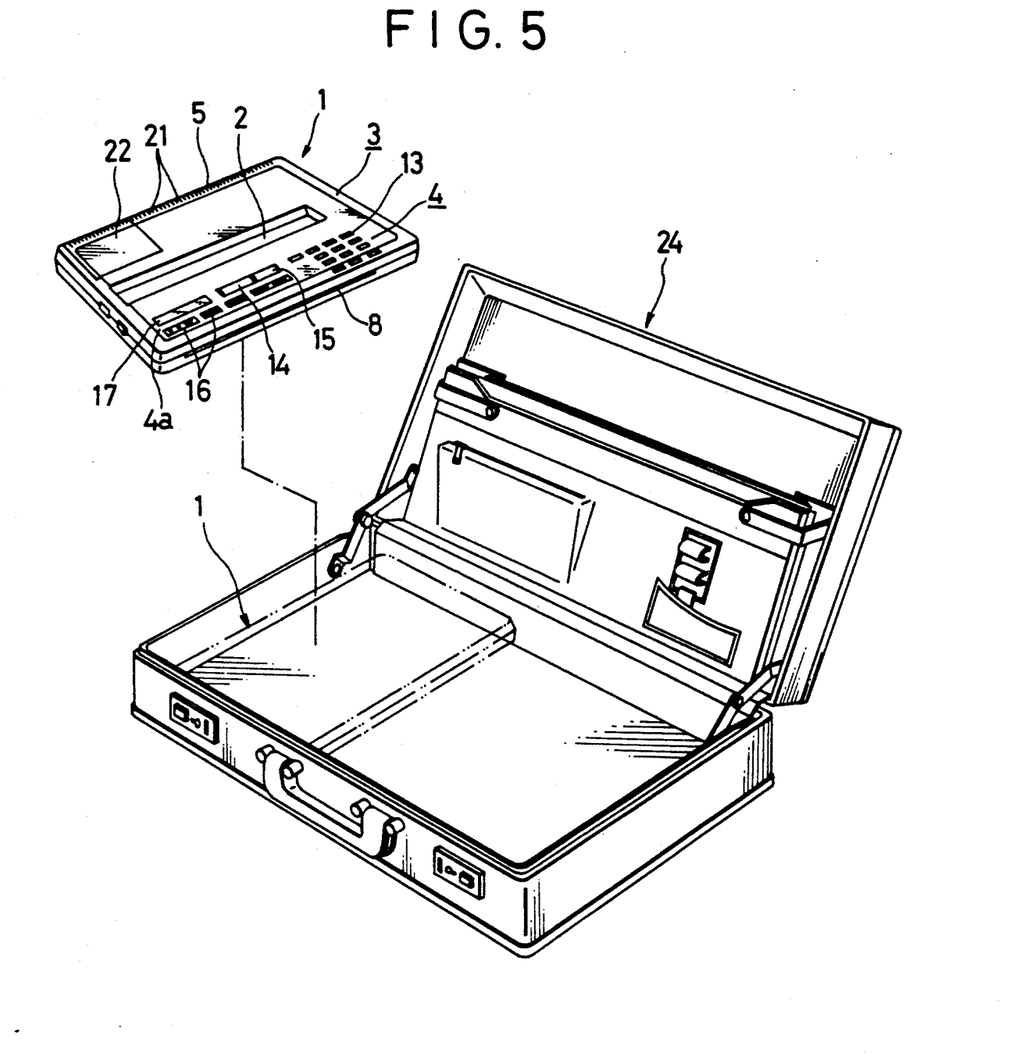
FIG. 5 is a perspective view of the entire original reading apparatus of FIG. 1 showing a form of a condition suitable for carrying.

Specifically, the facsimile apparatus 1 with which intended miniaturization is achieved has such a size that it occupies, when it is accommodated in a common attaché case of a size sufficient to accommodate a document of the A3 size therein without being folded as illustrated in FIG. 5, only a half or so of an internal spacing of the attaché case 24. Accordingly, in the inside of the attaché case 24, for example, an original 23 or the like of the A4 size can be accommodated alongside the facsimile apparatus 1, and consequently, the spacing efficiency is very high.

It is to be noted that, when the facsimile apparatus 1 is to be carried without being accommodated in such attaché case 24 or the like, it can be carried very readily like a book by holding the entire apparatus under an arm without gripping the gripping section 5 by a hand. Also in this instance, since the apparatus is very small in size and very light in weight, it can be carried readily.

Figure 6:
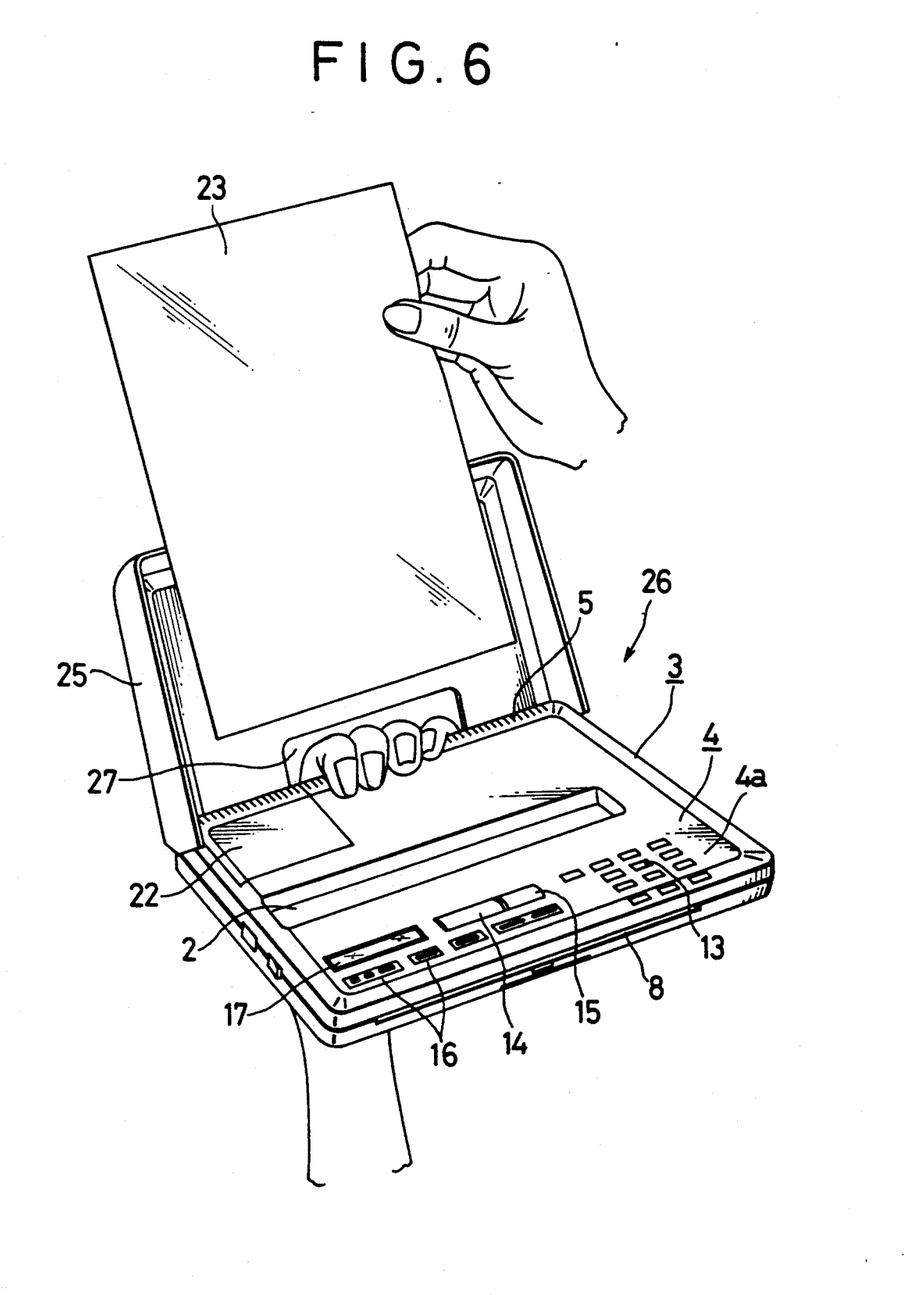
FIG. 6 is a perspective view showing an entire modified original reading apparatus together with a manner of use thereof.

It is to be noted that, while the facsimile apparatus 1 of the present embodiment has such configuration that the original insertion opening 2, operating section 4 and so forth are normally exposed to the outside, the present invention is not limited to such specific structure as described above. For example, as illustrated in FIG. 6, a body cover 25 for removably covering over a surface of the apparatus may be mounted on the body case 3.

The body cover 25 thus protects the facsimile apparatus 1 from admission of dust or the like and direct collision with an external body. Further, in the facsimile apparatus 26 shown in FIG. 6, a slit 27 serving as an opening for the insertion of fingers is formed in the body cover 25 so that the gripping section 5 may be gripped even if the body cover 25 is opened when a reading and transmitting operation of an original 23 is to be performed.

It is to be noted that, when the present invention is put into practice, a modified structure may be employed wherein the feed roller 9 is not provided and an original 23 introduced into the original passageway 10 from the original insertion opening 2 is transported only be means of the white roller 11.

Figure 7:
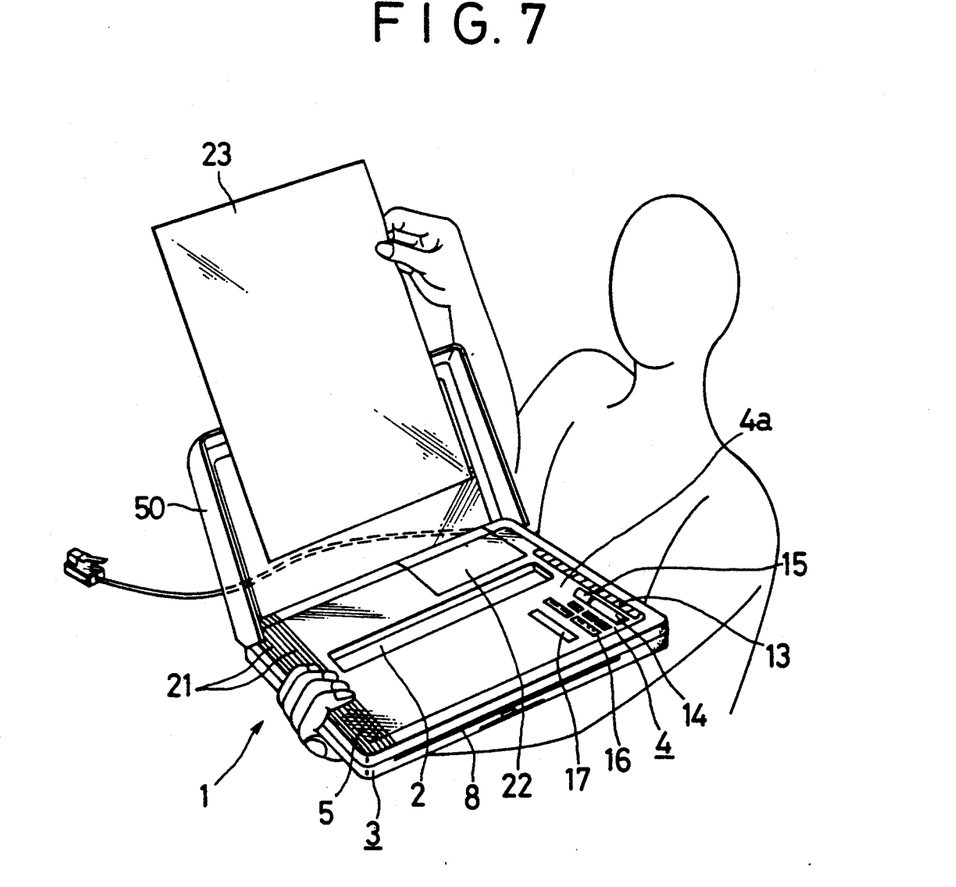
FIG. 7 is a perspective view of an entire original reading apparatus showing a second embodiment of the present invention.
Figure 8:
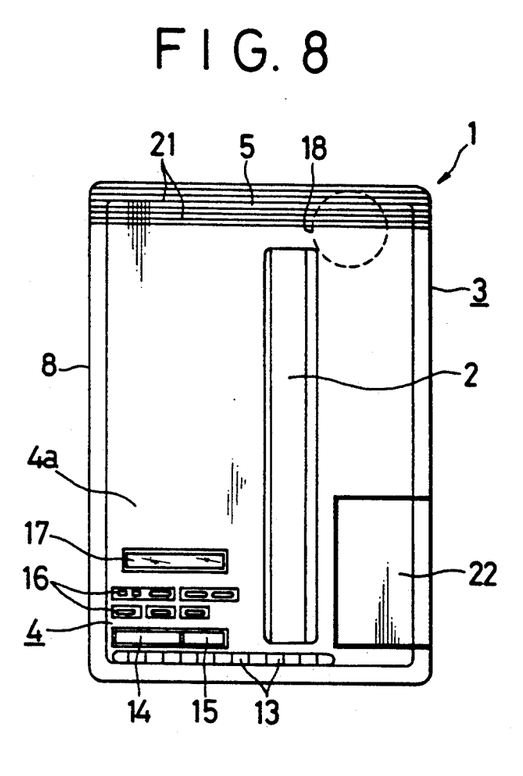
FIG. 8 is a plan view of the original reading apparatus of FIG. 7.
Figure 9:
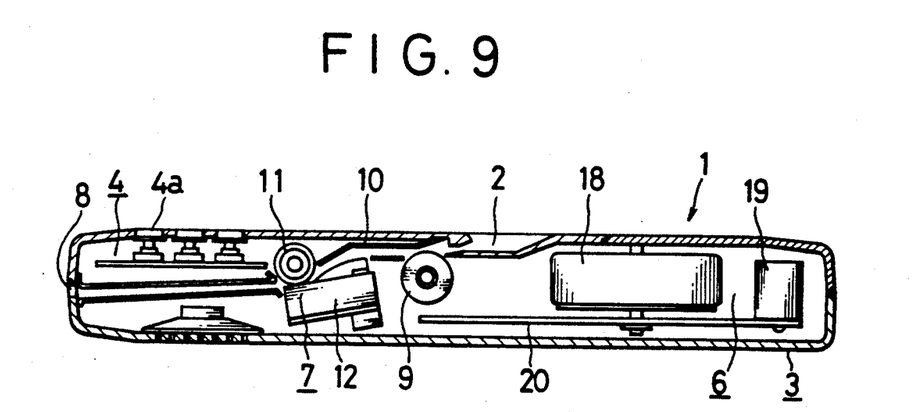
FIG. 9 is an enlarged vertical sectional front elevational view of the original reading apparatus of FIG. 7.

A second embodiment of the present invention will be described with reference to FIGS. 7 to 11. Like parts to those of the first embodiment are denoted by like reference numerals, and overlapping description thereof will be omitted herein (this similarly applies to any other embodiment or modification described hereinbelow). First, the facsimile apparatus 1 of the present embodiment is constituted such that, as shown in FIGS. 7 and 8, the body case 3 is formed as a flattened casing which is elongated in a depthwise direction thereof. Then, the body case 3 has an original insertion opening 2 formed at a substantially mid portion of an upper wall thereof such that it extends in a depthwise direction of the body case 3. An operating section 4 is provided at left-hand side portion of a front end of the body case 3 while a battery not shown and a battery cover 22 are provided at a right-hand side location of the front end of the body case 3, and a gripping section 5 is provided at a rear end of the body case 3. Further, as shown in FIG. 9, a control unit 6 is provided at a right location in the inside of the body case 3, and an original reading section 7 is provided at a substantially central location of the inside of the body case 3. An original discharging opening 8 is formed at a left end face of the body case 3 and is communicated with the original insertion opening 3 by way of an original passageway 10. Further, a body cover 50 is supported for pivotal motion at a right edge portion of the body case 3 such that it removably covers over an entire upper face of the apparatus 1.

With the facsimile apparatus 1 of such construction as described above, when picture image information of an original 23 is to be read and transmitted, the gripping section 5 of the body case 3 with the body cover 50 opened is gripped by the left hand from below the apparatus 1 while the original 23 is inserted into the original insertion opening 2 and the operating section 4 is operated by the right hand. Consequently, the original 23 thus introduced into the apparatus 1 by way of the original insertion opening 2 is transported leftwardly along the original passageway 10 and discharged from the original discharging opening 8. Accordingly, such an operation as successively supplying a large number of originals 23 into the original insertion opening 2 by the right hand can be performed readily. In this instance, the original 23 for which reading scanning has been completed and which is discharged from the original discharging opening 8 is discharged in a direction in which it will not collide with the body of the user or the like.

Further, since the length of the original insertion opening 2 depends upon a size of an original 23, when it is intended to form the body case 3 with a minimum depthwise length, the original insertion opening 2 should extend to the opposite ends of the body case 3.

However, since the gripping section 5 must necessarily be formed with a width suitable for gripping at an end of the body case 3, the dimension of the body case 3 in the depthwise direction is reduced by forming the original insertion opening 2 in the form of a slit elongated in the depthwise direction such that, as illustrated in FIG. 8, it extends to a location near a front side edge portion of the upper wall of the body case 3 and disposing the components 14 to 17 of the operating section 4 alongside the original insertion opening 2.

Figure 10:
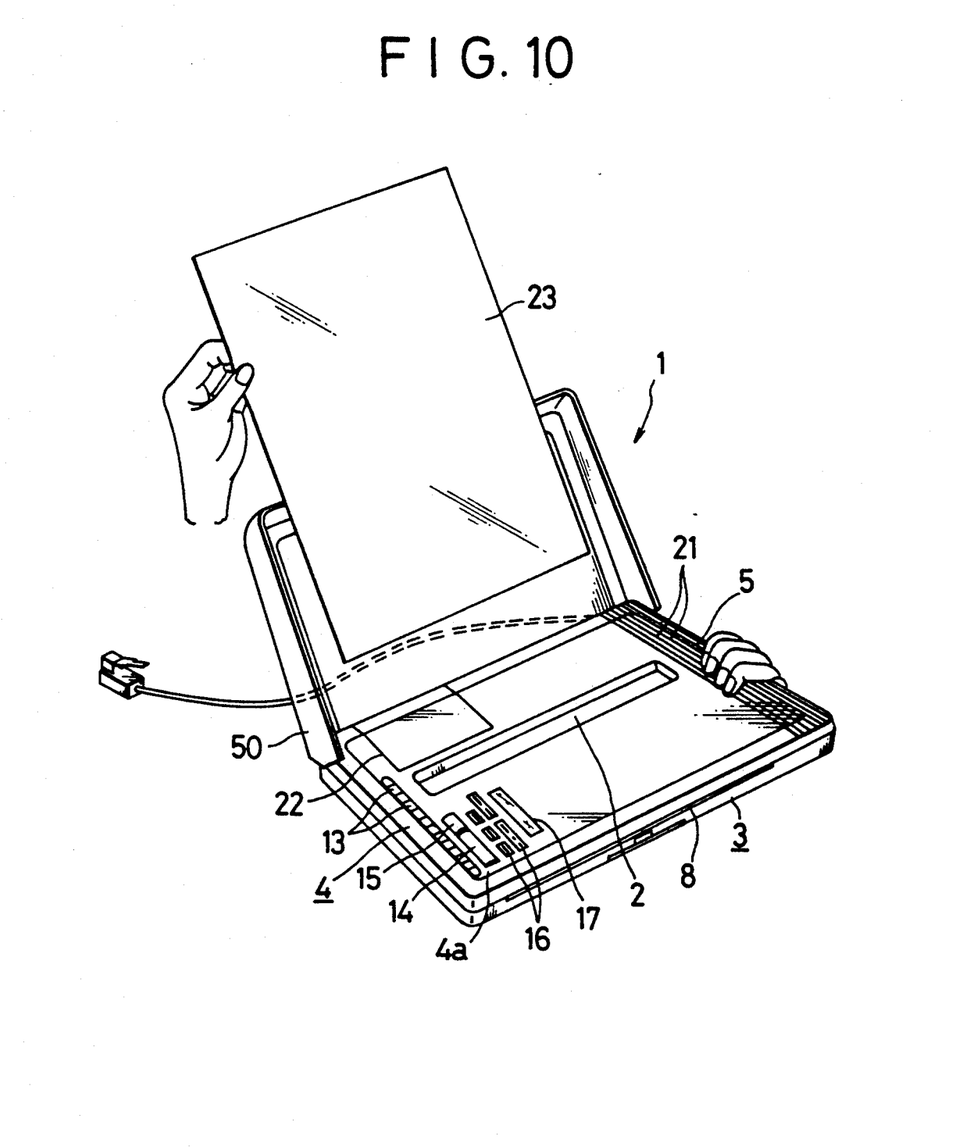
FIG. 10 is a perspective view showing an entire modified original reading apparatus together with a manner of use thereof.
Figure 11:
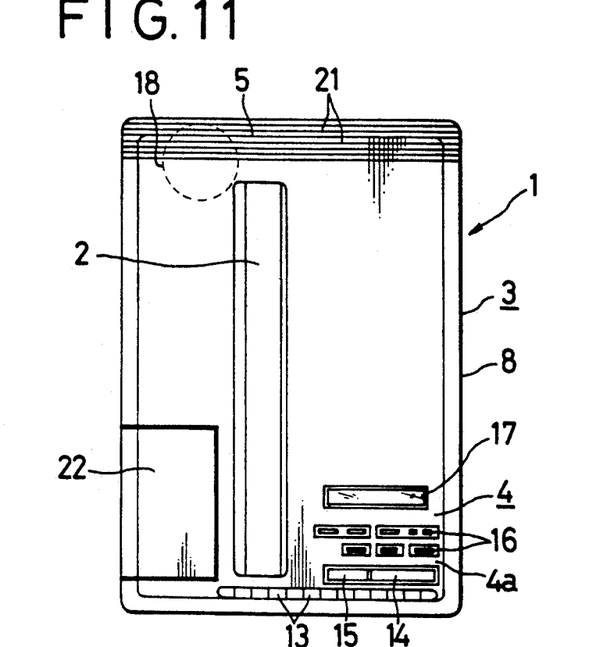
FIG. 11 is a plan view of the modified original reading apparatus of FIG. 10.

It is to be noted that, while the facsimile apparatus 1 of the present embodiment is shown constructed for a right-handed user such that an original 23 is transported from the right to the left of the facsimile apparatus 1, the present invention is not limited to the specific structure, and for example, an original reading apparatus of the present invention may be formed as such a facsimile apparatus 26 for a left-handed user wherein an original 23 is transported from the left to the right as illustrated in FIGS. 10 and 11.

Figure 12:
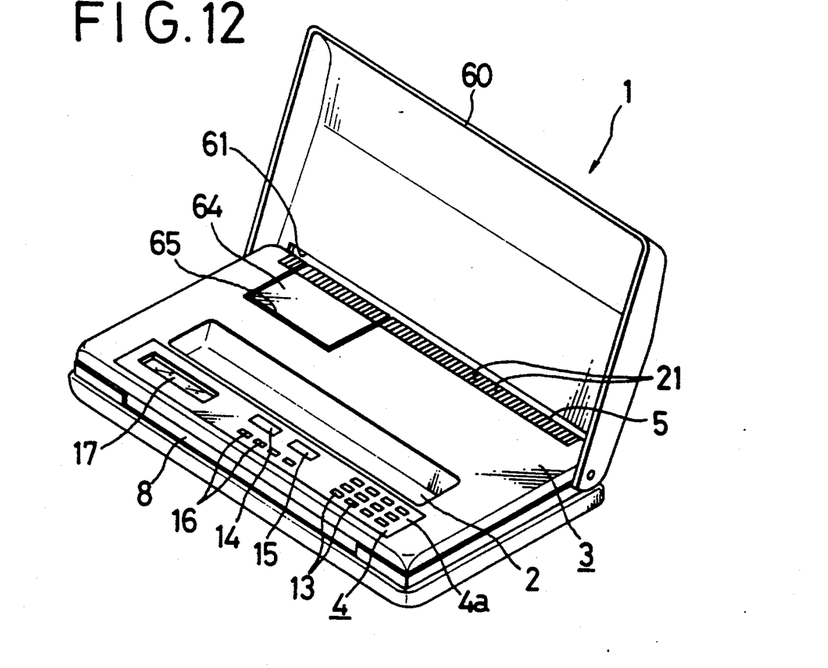
FIG. 12 is a perspective view of an original reading apparatus with a body cover opened showing a third embodiment of the present invention.
Figure 13:
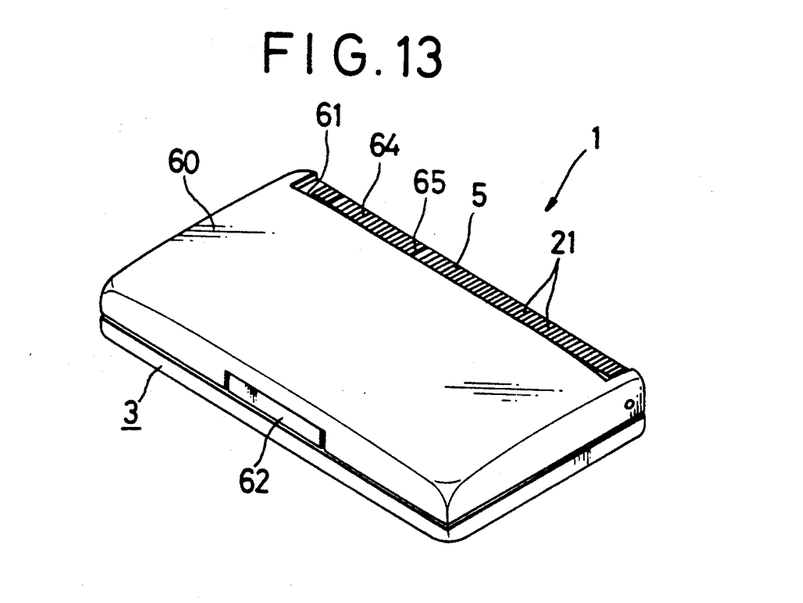
FIG. 13 is a perspective view showing the body cover of FIG. 12 in a closed condition.

A third embodiment of the present invention will be described with reference to FIGS. 12 to 16. First, in the facsimile apparatus 1 of the present embodiment, a body cover 60 is supported for pivotal motion at a rear end portion of a body case 3 such that it removably covers over a substantially entire area of an upper face and a front face of the body case 3 as illustrated in FIGS. 12 and 13. An opening 61 is formed at a rear end portion of the body cover 60 such that it allows the rear end portion of the body case 3 to be exposed to the outside whether the body cover 60 is in an open condition or closed condition. Further, a hook 62 of a locking mechanism (not shown) for locking the body cover 60 to the body case 3 is provided at a front end portion of the body cover 60.

Figure 14:
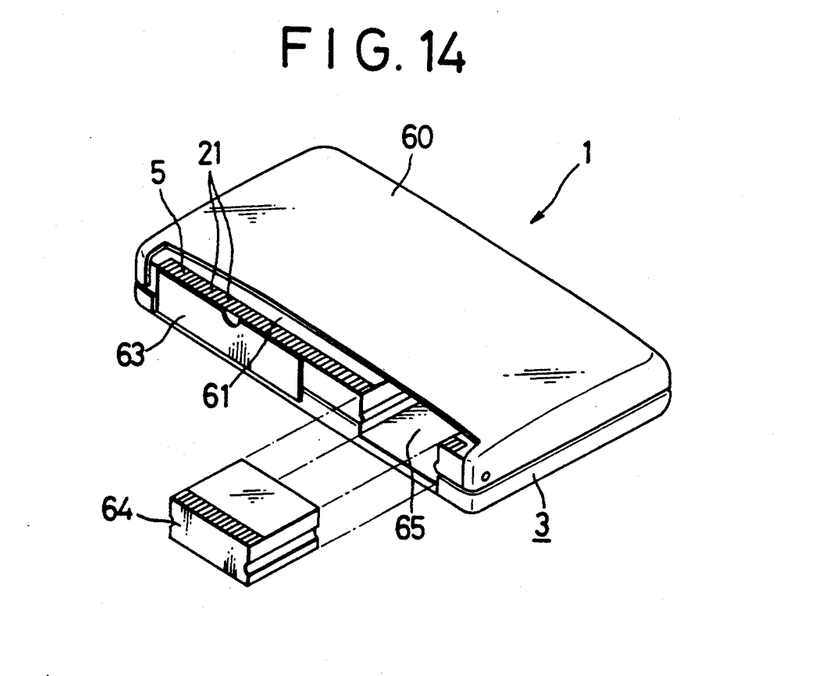
FIG. 14 is a fragmentary perspective view of the original reading apparatus of FIG. 12 illustrating loading or unloading of a battery into or from the apparatus.

A socket cover 63 is mounted for opening and closing movement at a rear end face of the body case 3 as shown in FIG. 14, and though not shown, a connecting socket section of a power source cable or a modular connector is provided in the inside of the body case 3 covered with the socket cover 63. Further, a socket section 65 for removably holding a battery 64 therein in a depthwise direction of the facsimile apparatus 1 is provided on a rear end face of the body case 3. Here, the battery 64 mounted on the socket section 65 makes part of the gripping section 5, which is exposed to the outside of the facsimile apparatus 1 through the opening 61 whether the body cover 60 is in an open condition or closed condition.

With the facsimile apparatus 1 of the construction described above, the socket cover 63 is opened to expose the connecting socket section and a telephone line is connected to the thus exposed connecting socket section by way of a cable or a modular connector (not shown) to which an acoustic coupler of such structure that it can be mounted on a hand set is connected. Then, the body cover 60 is opened to expose the original insertion opening 2, original discharging opening 8 and transmitting operating section 4, and then a setting operation of an original 23 and a transmitting operation are performed. In this instance, a hand of the user extends through the opening 61 of the body cover 60 and grips the gripping section 5 to hold the body case 3 from below thereon while a transmitting operation is performed with the other hand.

On the other hand, when the facsimile apparatus 1 is to be carried, the body cover 60 and the socket cover 63 are closed to cover over the various openings of the facsimile apparatus including the original insertion opening 2, original discharging opening 8 and connecting socket and the operating section 4, and the gripping section 5 which is exposed from the opening 61 of the body cover 60 is gripped by one hand. In this instance, the facsimile apparatus 1 presents a generally flat configuration and is easy to carry, and further, such a situation does not take place during carrying of the facsimile apparatus 1 that dust is admitted into the facsimile apparatus 1 by way of the openings and sticks to various components of the facsimile apparatus 1 such as the image sensor 12 to deteriorate the performances of the components. Besides, such a possible accident can be prevented that any of the keys 13 to 16 of the transmitting operating section 4 is inadvertently depressed to cause an erroneous operation of or damage to the facsimile apparatus 1.

Further, since a rear end portion of the body case 3 is exposed to the outside from the opening 61 formed at the rear end portion of the body cover 60 whether the body cover 60 is in an open condition or closed condition, replacement of a battery 64 and connection of a modular connector can be performed readily and rapidly whether the body cover 60 is in an open condition or closed condition.

Figure 15:
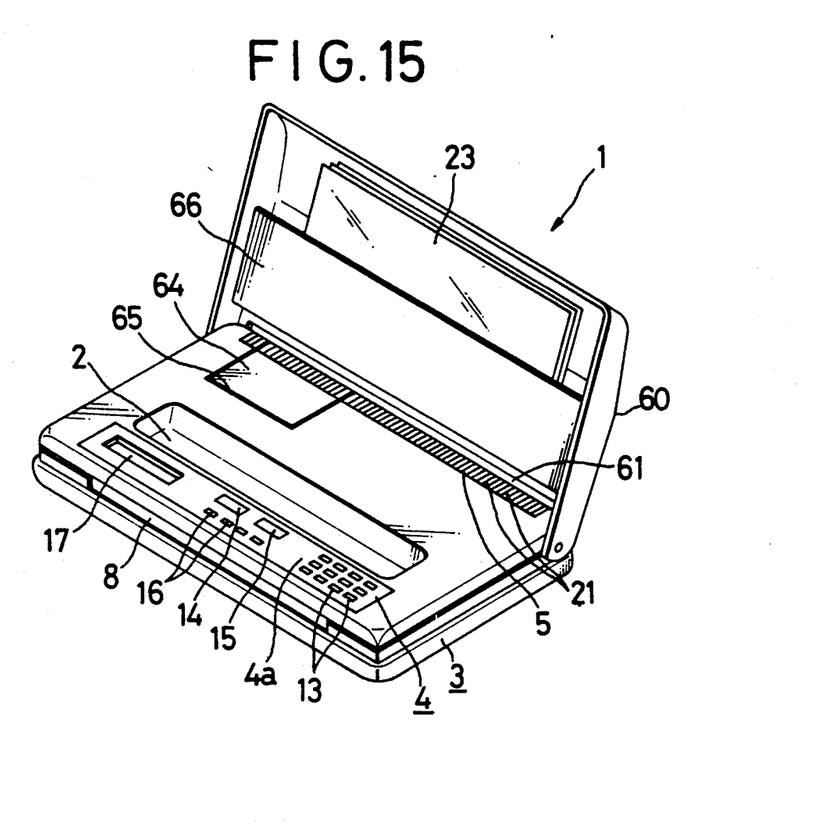
FIG. 15 is a perspective view showing an entire modified original reading apparatus.
Figure 16:
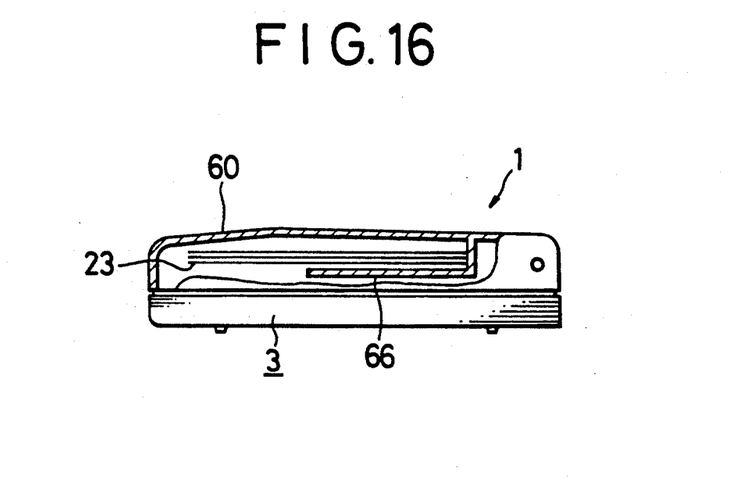
FIG. 16 is a side elevational view showing the modified original reading apparatus partly in section at a body cover thereof.

FIGS. 15 and 16 show a modification to the facsimile apparatus 1 of the third embodiment described above. In the modified facsimile apparatus, an accommodating section 66 for an original 23 or the like is formed on an inner face of the body cover 60. Due to such construction, an original 23 or the like can be accommodated in the accommodating section 66 of the body case 60, and accordingly, an efficient operation can be performed at a location to which the facsimile apparatus has been carried.

What is claimed is:

1. A portable original reading apparatus which can be operated while being hand-held, comprising:
   a body case;
   means for defining an original insertion opening in a wall of said body case;
   means for defining an original passageway in the inside of said body case in such a manner as to communicate with said original insertion opening;
   an original transporting section disposed in said original passageway for transporting an original introduced into said original passageway from said original insertion opening;
   a driving section disposed in said body case for driving said original transporting section;
   an original reading section disposed in said original passageway for reading data of the original transported along said original passageway;
   an operating section disposed in a juxtaposed relationship with respect to a horizontal direction and disposed at a substantially same height as said original reading section in said body case when said body case is in a horizontal orientation, and having an operating face positioned at a surface of said body case;
   an electric controlling section for electrically controlling said operating section, driving section and original reading section; and
   a power source section for supplying power to said operating section, driving section, original reading section and electric controlling section.

2. A portable original reading apparatus which can be operated while being hand-held, comprising:

a body case;

means for defining an original insertion opening in a wall of said body case;

means for defining a substantially horizontal original passageway in the inside of said body case in such a manner as to communicate with said original insertion opening;

an original transporting section disposed in said original passageway for transporting an original introduced into said original passageway from said original insertion opening;

a driving section disposed in said body case for driving said original transporting section;

an original reading section disposed in said original passageway for reading data of the original transported along said original passageway;

an operating section disposed in a juxtaposed relationship with respect to a horizontal direction and disposed at a substantially same height as said original reading section in said body case when said body case is disposed in a horizontal orientation, and having an operating face positioned at a surface of said body case;

an electric controlling section for electrically controlling said operating section, driving section and original reading section; and a power source section for supplying power to said operating section, driving section, original reading section and electric controlling section.

3. A portable original reading apparatus which can be operated while being hand-held, comprising:

a body case;

means for defining an original insertion opening in a wall of said body case;

means for defining an original passageway in the inside of said body case in such a manner as to communicate with said original insertion opening;

an original transporting section disposed in said original passageway for transporting an original introduced into said original passageway from said original insertion opening;

a driving section disposed in said body case for driving said original transporting section;

an original reading section disposed in said original passageway in a juxtaposed relationship with respect to a horizontal direction and disposed at a substantially same height as said driving section for reading data of the original transported along said original passageway;

an operating section disposed in a juxtaposed relationship with respect to a horizontal direction and disposed at a substantially same height as said original reading section in said body case when said body case is in a horizontal orientation, and having an operating face positioned at a surface of said body case;

an electric controlling section disposed in the neighborhood of said driving section in a juxtaposed relationship with respect to a horizontal direction and disposed at a substantially same height as said original reading section for electrically controlling said operating section, driving section and original reading section; and a power source section disposed in the neighborhood of said electric controlling section and driving section in a juxtaposed relationship with respect to a horizontal direction and disposed at a substantially same height as said original reading section for supplying power to said operating section, driving section, original reading section and electric controlling section.

4. A portable original reading apparatus according to any one of claims 1 to 3, wherein said original insertion opening is formed in an upper wall of said body case and part of said original passageway is disposed below said operating section.

5. A portable original reading apparatus according to any one of claims 1 to 3, wherein said original reading section includes a white roller and a closely contacting line reading sensor for contacting with said white roller across said original passageway, and said original transporting section is constituted from said white roller opposing to said closely contacting line reading sensor.

6. A portable original reading apparatus according to claim 5, wherein said closely contacting line reading sensor is disposed in a condition a little inclined from a horizontal plane.

7. A portable original reading apparatus according to any one of claims 1 to 3, wherein said original insertion opening is formed in an elongated condition at a central portion of an upper wall of said body case.

8. A portable original reading apparatus according to any one of claims 1 to 3, wherein said original insertion opening and said operating section are disposed such that the lengths thereof extend in leftward and rightward directions of said body case.

9. A portable original reading apparatus according to any one of claims 1 to 5, wherein said operating section is formed from a flat keyboard.

10. A portable original reading apparatus according to any one of claims 1 to 3, wherein said driving section includes a motor, and said original transporting section includes a rotatable roller member connected to said motor and having an axis extending in a horizontal direction.

11. A portable original reading apparatus according to any one of claims 1 to 3, further comprising a body cover supported for pivotal opening and closing motion at a rear portion of said body case to removably cover over said operating face of said operating section and said original insertion opening.

12. A portable original reading apparatus according to any one of claims 1 to 3, wherein said power source section includes a battery removably mounted on a rear face of said body case in a horizontal direction.

13. A portable original reading apparatus according to claim 12, further comprising a body cover supported for pivotal opening and closing motion at a rear portion of said body case to removably cover over said operating face of said operating section and said original insertion opening, and said body cover has an opening formed therein which allows a socket section of said body case to be exposed to the outside whether said body cover is in an open condition or closed condition.

14. A portable original reading apparatus according to any one of claims 1 to 3, wherein said body case has a gripping section provided at a rear end of an upper face thereof while said operating face of said operating section is disposed at a front end portion of the upper face of said body case, and said original insertion opening is disposed at a central portion of the upper face of said body case.

15. A portable original reading apparatus according to claim 14, wherein said original insertion opening is formed such that the length thereof extends in a depthwise direction of said body case.

16. A portable original reading apparatus according to claim 14, further comprising a body cover supported for pivotal opening and closing motion at a rear portion of said body case to removably cover over said operating face of said operating section and said original insertion opening, and said body cover has an opening formed therein which allows said gripping section to be exposed to the outside whether said body cover is in an open condition or closed condition.

17. The portable original reading apparatus of any one of claims 1 to 3, wherein said driving section includes a motor having an output shaft extending at least substantially vertically, said motor providing a drive for at least one roller having a horizontally extending axis.

* * * * *